United States Patent
Adharapurapu et al.

(10) Patent No.: US 12,428,713 B2
(45) Date of Patent: Sep. 30, 2025

(54) AMORPHOUS DUCTILE BRAZE ALLOY COMPOSITIONS, AND RELATED METHODS AND ARTICLES

(71) Applicant: General Electric Company, Schenectady, NY (US)

(72) Inventors: Raghavendra Rao Adharapurapu, Bangalore (IN); Michael Francis Xavier Gigliotti, Jr., Glenville, NY (US); David Edwin Budinger, Loveland, OH (US); Pazhayannur Ramanathan Subramanian, Niskayuna, NY (US); Jeffrey Jon Schoonover, Albany, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/454,365

(22) Filed: Aug. 23, 2023

(65) Prior Publication Data
US 2023/0398621 A1 Dec. 14, 2023

Related U.S. Application Data

(63) Continuation of application No. 15/389,779, filed on Dec. 23, 2016, now Pat. No. 11,759,877.

(51) Int. Cl.
| | |
|---|---|
| *C22C 45/04* | (2006.01) |
| *B23K 1/00* | (2006.01) |
| *B23K 35/30* | (2006.01) |
| *F01D 5/00* | (2006.01) |
| *F01D 5/28* | (2006.01) |
| *F01D 25/00* | (2006.01) |
| *F01D 25/24* | (2006.01) |
| *B23K 101/00* | (2006.01) |
| *B23K 103/08* | (2006.01) |

(52) U.S. Cl.
CPC ............ *C22C 45/04* (2013.01); *B23K 1/0018* (2013.01); *B23K 35/3033* (2013.01); *F01D 5/005* (2013.01); *F01D 5/282* (2013.01); *F01D 25/005* (2013.01); *F01D 25/24* (2013.01); *B23K 2101/00* (2018.08); *B23K 2101/001* (2018.08); *B23K 2103/08* (2018.08); *F05D 2230/237* (2013.01); *F05D 2230/80* (2013.01); *F05D 2300/175* (2013.01)

(58) Field of Classification Search
CPC .................................................... C22C 45/04
See application file for complete search history.

(56) References Cited

U.S. PATENT DOCUMENTS

| | | |
|---|---|---|
| 4,396,577 A | 8/1983 | Smith, Jr. et al. |
| 4,414,178 A | 11/1983 | Smith, Jr. et al. |
| 5,815,791 A | 9/1998 | Sporer |
| 7,506,793 B2 | 3/2009 | Sathian |
| 8,197,747 B2 | 6/2012 | Huang |
| 8,563,142 B2 | 10/2013 | Bossmann et al. |
| 2001/0012491 A1 | 8/2001 | Strietzel |
| 2006/0068691 A1 | 3/2006 | Sung et al. |
| 2008/0017694 A1 | 1/2008 | Schnell et al. |
| 2009/0041611 A1 | 2/2009 | Sathian et al. |
| 2013/0028783 A1 | 1/2013 | Ott et al. |
| 2013/0045129 A1 | 2/2013 | Ott et al. |
| 2013/0224561 A1 | 8/2013 | Adharapurapu et al. |
| 2013/0260178 A1 | 10/2013 | Sansom et al. |

FOREIGN PATENT DOCUMENTS

| | | |
|---|---|---|
| EP | 0668822 B1 | 3/1999 |
| EP | 1082190 B1 | 7/2002 |
| EP | 2558245 B1 | 3/2014 |
| EP | 2754529 A1 | 7/2014 |
| WO | WO2013/130192 A1 | 9/2013 |

OTHER PUBLICATIONS

Bose et al., High Strength Nickel-Palladium-Chromium Brazing Alloys, Welding Research Supplement, Jan. 1986, 23-30.

Hirane et al., Liquid Phase Diffusion Bonding of a Nickel-Base Oxide Dispersion Strengthened Alloy MA 754, Tetsu-to-Hagané, vol. 72, No. 10, 1986, 1590-1597. https://doi.org/10.2355/tetsutohagane1955.72.10_1590.

Rabinkin et al., Amorphous TiZr—Base Metglas® Brazing Filler Metals, Metallurgica and Written Material, vol. 25, Issue 2, Feb. 1991, pp. 399-404.

Tsunoda et al., Joint Strength and Microstructures of Brazed Joints of Stainless Steel with Fe-based Filler, Electronics Packaging Technology Conference (EPTC), 2014 IEEE 16th, Dec. 3-5, 2014, 855-858.

*Primary Examiner* — Jophy S. Koshy
(74) *Attorney, Agent, or Firm* — Dority & Manning, P.A.

(57) ABSTRACT

A nickel-based braze alloy composition is described, including nickel, about 1 weight % to about 5 weight % boron (B); and about 1 weight % to about 20 weight % germanium (Ge). The composition is free of any silicon. Superalloy articles that contains a crack or other type of void or gap filled with the nickel-based braze alloy composition are also described, along with methods for filling such a gap. Related articles of manufacture and brazing processes to join metal components are also disclosed.

12 Claims, 3 Drawing Sheets

AMORPHOUS DUCTILE BRAZE ALLOY COMPOSITIONS, AND RELATED METHODS AND ARTICLES

PRIORITY INFORMATION

The present application claims priority to, and is a continuation of, U.S. patent application Ser. No. 15/389,779 filed on Dec. 23, 2016, the disclosure of which is incorporated by reference herein in its entirety for all purposes.

BACKGROUND OF THE INVENTION

Gas turbine engines for power plants, aviation, and other applications include a large number of components, such as nozzles, combustors, and turbine vanes and blades. Many of the engine parts are formed from specially-designed cobalt-base and nickel-based superalloys. The engines operate under strenuous, high temperature conditions, in which various types of damage or deterioration can occur. For example, erosion and cracks tend to develop at the trailing edge of nozzles during service, due to stresses that are aggravated by frequent thermal cycling. Over time, the severe operating conditions of the nozzles can develop cracks that measure up to one millimeter wide and fifty millimeters or more in length. Because the cost of components formed from high temperature cobalt and nickel-based superalloys is relatively high, it is typically more desirable to repair these components than to replace them.

Brazing has become one of the most effective repair techniques in recent years for these types of superalloy components. Many different braze compositions are available. Just a few examples are set forth in U.S. Pat. No. 6,165,290 (Rabinkin), U.S. Pat. No. 6,530,971 (Cohen et al), U.S. Pat. No. 6,520,401 (Miglietti), and U.S. Pat. No. 7,651,023 (Huang et al.). In addition to repairing cracks, the compositions are often used for joining superalloy components together, and for providing critical seals in turbine engines, e.g., abradable honeycomb seals that need to be attached to carrier structures within a stator-rotor interface.

There are certain, key requirements for braze materials, whether used in a joining process or a repair process. First, they should be capable of being applied effectively to the component(s), e.g., with sufficient flow and wettability characteristics. Second, they must be capable of eventually solidifying into a joint or fill-material that exhibits strength, ductility, and oxidation resistance. Third, the compositions must be cost-effective for a given application.

Moreover, the braze compositions sometimes need to be amenable to wide adjustment in melting temperature, for use in many different repair situations. (The materials must melt at temperatures low enough to protect the base material or workpiece from becoming overheated or otherwise damaged). Many brazing operations for gas turbine components continue to require braze materials with demanding flow characteristics.

It is therefore often necessary to incorporate significant amounts of a metalloid element like silicon into the braze composition, to effectively reduce its melting temperature. However, the presence of silicon can be detrimental to the final braze product. For example, silicon tends to form brittle, hard intermetallic phases in the braze microstructure.

In some cases, large amounts of gold are used in the braze composition, e.g., up to about 80% (Nioro™ alloys having a general composition of 82% Au-18% Ni). The presence of gold can be very effective for ensuring a desired liquidus temperature, while also providing corrosion protection to a braze structure. However, the use of large amounts of gold can greatly increase the cost of the braze alloy. Moreover, the presence of relatively high levels of gold with a braze constituent like germanium may reduce the melting point of the alloy to below about 500° C.—a level that would be impractical for many braze applications related to gas turbine components. Furthermore, the presence of higher levels of gold with manganese may lead to the formation of excessive amounts of gold-manganese compounds that are undesirable for many braze systems.

It should thus be apparent that new braze compositions for use with nickel-based superalloys would be very welcome in the art. The compositions should have a melting point low enough for many current brazing operations (e.g., for selected parts of turbine engines), but should also be capable of a considerable adjustment in melting point, depending on the intended end use. They should also be free of silicon, which would otherwise lead to the formation of brittle phases. The compositions should also remove or reduce the presence of elements that would greatly increase cost, such as gold. At the same time, the braze compositions should be capable of producing a braze joint or structure that exhibits the necessary characteristics for a given end use application, e.g., a desirable level of strength, ductility, and oxidation resistance.

BRIEF DESCRIPTION OF THE INVENTION

An embodiment of the invention is directed to a nickel-based braze alloy composition, comprising
 a) nickel (Ni);
 b) about 1 weight % to about 5 weight % boron (B); and
 c) about 1 weight % to about 20 weight % germanium (Ge);
 wherein the composition is free of silicon.

Another inventive embodiment relates to a superalloy article that contains a crack or other type of gap filled with the nickel-based braze alloy composition described herein; and a method for filling such a crack.

Still another embodiment relates to an article that comprises at least two metallic components joined together by the nickel-based braze alloy composition described herein.

An additional embodiment is directed to a nickel-based braze alloy structure having a crystalline microstructure. The braze alloy comprises nickel, boron, and germanium, and is free of silicon.

A further embodiment embraces a method for joining a metal component to another metal component by brazing, comprising:
 i) introducing a nickel-based braze alloy composition between the metal components; and then
 ii) heating the components to form a braze seal (joint) between them. The nickel-based braze composition is described in detail herein.

DETAILED DESCRIPTION OF THE INVENTION

Figure 1:
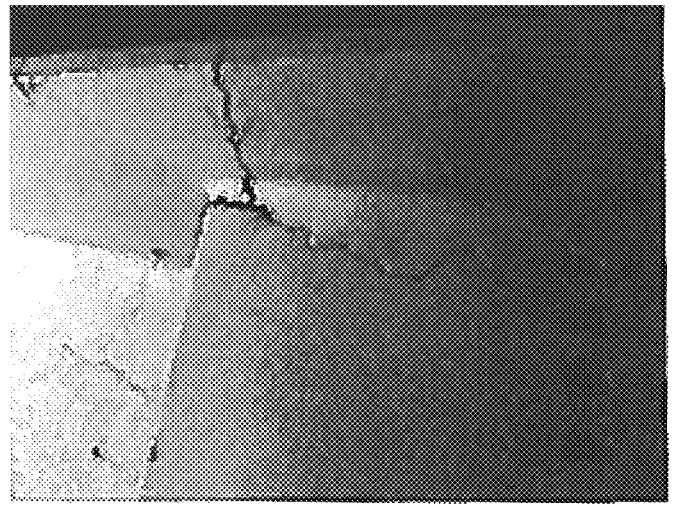
FIG. 1 is a photograph of one type of crack in a superalloy component.

A number of introductory notes may be helpful. When introducing elements of various embodiments of the present invention, the articles "a," "an," "the," and "said" are intended to mean that there are one or more of the elements, unless otherwise indicated. Moreover, the term "and/or" includes any and all combinations of one or more of the associated listed items. The terms "comprising," "including," and "having" are intended to be inclusive, and mean that there may be additional elements other than the listed elements. Approximating language, as used herein throughout the specification and claims, may be applied to modify any quantitative representation that could permissibly vary without resulting in a change in the basic function to which it is related. Accordingly, a value modified by a term or terms, such as "about" or "substantially" is not to be limited to the precise value specified. In some instances, the approximating language may correspond to the precision of an instrument for measuring the value.

Additional terminology related to braze compositions and processes may be useful in this disclosure. Typically, "brazing" uses a braze material (usually an alloy) having a lower liquidus temperature than the melting points of the components (i.e. their materials) to be joined. The braze material is brought slightly above its melting (or liquidus) temperature while protected by a suitable atmosphere. The braze material then flows over the components (known as wetting), and is then cooled to join the components together. As used herein, "braze alloy composition" or "braze alloy", "braze material" or "brazing alloy", all refer to a composition that has the ability to wet the components to be joined, and to seal them.

A braze alloy, for a particular application, should withstand the service conditions required, and should melt at a lower temperature than the base materials; or melt at a specified temperature. Terms such as "liquidus temperature" and "solidus temperature" should be considered according to their standard definitions in the brazing art, as noted in published U.S. Patent Application 2013/0224561 (Adharapurapu et al), incorporated herein by reference.

Moreover, as used herein for some of the embodiments, "sealing" is a function performed by a structure that joins other structures together, to reduce or prevent leakage through a joint, between the other structures. A seal structure may simply be referred to as a "seal."

As used herein, the term "brazing temperature" refers to a temperature to which a brazing structure is heated to enable a braze alloy to wet the components to be joined, and to form a braze joint, seal, or filler-structure. The brazing temperature is often higher than or equal to the liquidus temperature of the braze alloy. In addition, the brazing temperature should be lower than the temperature at which the components to be joined may not remain chemically, compositionally, and mechanically stable. There may be several other factors that influence the brazing temperature selection, as those skilled in the art understand.

As used herein, "ductility" refers to the ability of a solidified braze alloy to deform under tensile stress, as further described in the Examples which follow.

The braze compositions of this invention are nickel-based, i.e., with nickel being the predominant element. The compositions contain at least about 40 weight % nickel, and frequently, at least about 45 weight % nickel. In some cases, nickel is present in a range of about 40 weight % to about 90 weight %, based on the weight of the entire composition. Frequently, the level of nickel is in a range of about 45 weight % to about 85 weight %, and in some preferred embodiments, up to about 70 weight %. As further described below, nickel-based systems described herein include the gamma prime (γ') phase—an important strengthening phase.

The nickel-based braze composition of this invention (sometimes referred to simply as the "alloy composition") further comprises about 1 weight % to about 5 weight % boron (B), based on the weight of the entire composition. The presence of boron is very important, ensuring the formation of an amorphous microstructure, sometimes referred to as "metallic glass". In some specific embodiments, boron is present at a level of about 1 weight % to about 3.4 weight %, and preferably, from about 1.6 weight % to about 3.25 weight %.

The braze alloy composition also includes germanium. Germanium functions as a melting point depressant, but also maintains the gamma prime structure of the nickel alloy, enhancing strength, ductility, and phase stability at high temperatures. These attributes—balanced with low viscosity or "flowability"—are key advantages over the use of silicon for melting point depression.

Moreover, a weak, chemical, interactive relationship between germanium and boron within a nickel alloy structure is especially advantageous when brazing Ni-superalloy parts to each other, or when repairing defects in those parts. One key attribute is the absence of Ni—B—Ge brittle phases in the amorphous braze, due to the absence of any borides of germanium. This is a distinct advantage over the use of B—Si binary constituents in a Ni-based braze, which may form several undesirable brittle phases, such as $Si_xB_y$ binary intermetallic phases.

A number of factors will influence the selected level of germanium. They include: the specific composition of the workpiece(s) being brazed; the desired melting point for the composition; ductility requirements for the brazed segment; oxidation resistance requirements for the brazed segment; the type of brazing technique employed; and the identity of the other elements present in the braze, like manganese or gold, which will affect the solubility of germanium in the nickel phase, for example. Other considerations may also be taken into account, e.g., cost and availability.

The general range for germanium is about 1 weight % to about 20 weight %, as mentioned above. In many specific embodiments, the range is about 2 weight % to about 18 weight %. In some selected crack repair applications, the level of germanium is preferably in the range of about 3 weight % to about 16 weight %, and in some cases, about 4 weight % to about 14 weight %.

In some embodiments of this invention (though not all embodiments), gold is present in the brazing composition. In addition to influencing a desired liquidus temperature when used together with germanium, the presence of gold can provide environmental resistance, e.g., corrosion protection. Moreover, gold can also enhance the ductility of the brazing alloy. When present, the level of gold should be no greater than about 10 weight %, and in some instances, no greater than about 7 weight %, e.g., a range of about 1 weight % to about 7 weight %. An especially preferred level of gold is about 0.05 weight % to about 5 weight %.

In some embodiments, the nickel-based braze composition of this invention further comprises manganese (Mn). In conjunction with the germanium that is present, manganese provides relatively high ductility for the braze, while also functioning to reduce the melting point of the composition. Although the inventors do not want to be bound by any specific theory, it appears that manganese promotes formation of the highly-ductile gamma prime $Ni_3Mn$, which is also a strengthening phase. The ductility of this phase compares very favorably with other typical nickel gamma prime phases in superalloys, such as $Ni_3Al$, $Ni_3Si$, and $Ni_3Ti$, which can sometimes exhibit brittle characteristics.

Many of the factors set forth above for constituents like germanium will also influence the amount of manganese to be used. Key factors for the manganese addition include the specific composition of the workpiece(s) being brazed, the desired melting point for the composition; ductility requirements for the brazed segment; and the amount of germanium that is present. In some exemplary embodiments, the level of manganese is in the range of about 5 weight % to about 28 weight %, and more often, about 10 weight % to about 20 weight %. The ratio (atomic) of manganese to germanium is preferably greater than about 1.1:1.0.

In many preferred embodiments, the braze alloy composition of this invention also includes chromium, which can provide excellent oxidation resistance, especially at high brazing temperatures. The level of chromium will depend on many of the factors set forth above, and is most often present in an amount of at least about 7 weight %, and preferably, at least about 14 weight %. In some embodiments, the level of chromium can be as high as about 18 weight % or perhaps 25 weight %, based on the total weight of the braze alloy. Usually, the range is about 7 weight % to about 15 weight %, and for some specific embodiments, about 7 weight % to about 12 weight %.

The braze alloy compositions of this invention also include cobalt, which can further increase oxidation resistance at high temperatures, along with improving microstructural stability, as well as creep resistance. Cobalt is especially desirable when the substrate (or components being joined) also contain cobalt. The amount of cobalt that is used will depend on many of the factors described above, as well as the amount of cobalt present in a substrate that will be attached to the braze structure. Usually, the level of cobalt is in the range of about 0.5 weight % to about 40 weight %, and more specifically, about 0.5 weight % to about 30 weight %. In some instances, the preferred level of cobalt is about 1 weight % to about 10 weight %. Moreover, combinations of chromium and cobalt are sometimes preferred.

In some additional embodiments, the braze composition contains at least one element selected from tantalum, niobium, molybdenum, and tungsten. Each of these elements can enhance the strength of the braze, e.g., by strengthening both the gamma and the gamma' (gamma prime) phases of the braze structure. When used, these elements are typically present at a level (individually) of about 0.5 weight % to about 8 weight %, and preferably, about 0.5-6 weight %. However, their specific levels are to some degree dependent on the workpiece being brazed, as well as the desired liquidus temperature for the braze. Moreover, the required balance between strength and ductility for the braze is an important consideration. (Iron may also sometimes be present, at the same levels as the refractory elements).

Several other elements are sometimes useful in the braze compositions conceived by the present inventors. They are carbon and yttrium. Carbon may be beneficial in forming carbides that control grain growth, while also beneficially influencing glass-formation. Yttrium can improve oxidation performance. Many of the factors described previously provide guidance as to the inclusion of these elements, and their relative amounts. Usually, each element is optionally present (independently) at a level in the range of about 0.01 weight % to about 0.20 weight %.

In preferred embodiments of the invention, the alloy composition must be free of silicon. While silicon can be an effective melting point depressant, its presence can also result in the formation of brittle intermetallic phases. Examples of the undesirable brittle phases include $Ni_3Si$ and $Ni_5Si_2$, as well as Ni—Si—B-based ternary compounds, such as $Ni_6Si_2B$ and $Ni_{4.9}Si_2B_{1.43}$. (As used herein "free of silicon" sometimes does allow for the presence of impurity levels of silicon, 0.5 weight % or less, that might be found in germanium raw material, for example. However, for high-purity raw materials, even the impurity-levels of silicon are absent).

In most embodiments, the alloy composition should also be free of palladium. Typically, palladium can be useful as a melting point depressant in various nickel-based braze compositions. However, when brazing under the conditions described herein, joining superalloy components, palladium can cause the formation of very brittle intermetallic compounds like $Pd_2Ge$. When manganese is present in the braze, troublesome high-temperature phases like MnPd can also form. Furthermore, at brazing temperatures, excess palladium has the tendency to combine with aluminum that may diffuse into the braze from the substrate(s), forming a continuous center-line compound $Pd_2Al$ that is deleterious to joint ductility. Moreover, formation of boride phases of palladium, in addition to the previously-mentioned intermetallics, can result in a continuous, center-line eutectic that may reduce joint ductility to an even greater degree. There are also increased costs associated with the use of palladium.

In most preferred embodiments, it is also preferable that aluminum not be present in the alloy braze composition, i.e., as the braze is applied on the substrate, in joining or repair operations. This is especially the case when the braze composition includes manganese. In that instance, aluminum and manganese can react, forming one or more undesirable manganese aluminide compounds, e.g., as $MnAl_x$ compounds where x is less than 1 (x<1). These compounds are very high-melting, e.g., about 1281° C., which is much greater than the melting points of either element, individually. (It should be noted, however, that aluminum can become incorporated into the braze joint by way of diffusion from superalloy or other metal components being repaired or joined to each other, during the brazing step. By that process, it is not expected that an excessive amount of undesirable compounds like the manganese aluminides will be formed; and the diffused aluminum can beneficially contribute to the gamma prime phase with nickel.)

Moreover, the brazing compositions of this invention sometimes exclude additional elements, especially when being used in exclusively a "metallic setting", e.g., joining metallic superalloy parts to each other, or repairing those parts—in contrast to joining a ceramic component to a metal component. As an example, it is sometimes desirable to exclude hafnium and zirconium. These elements are often useful in the prior art for strengthening the gamma prime (gamma') phase in certain types of brazes. However, for embodiments of the present invention, they can result in a significant reduction in ductility, due to the formation of brittle intermetallic compounds with manganese or germanium, such as $Ni_3(Ti,Mn)$, or $Ni_{16}Ti_6Ge_8$.

It should also be apparent that certain compositions within the scope of the overall teachings set forth herein are preferred for specific end uses for the brazing technique. Thus, for some embodiments, the braze alloy composition consists essentially of nickel, boron, and germanium, according to the ranges set forth above; while in other embodiments, the braze consists essentially of nickel, boron, germanium, and manganese. Still other compositions consist essentially of nickel, boron, germanium, manganese, and gold; and sometimes, nickel, boron, germanium, manganese, gold, chromium, and cobalt—again, according to the ranges noted previously.

As alluded to previously, the present inventors discovered that metal-to-metal braze structures with a desirable set of flow- and physical properties could be obtained by taking advantage of the glass-forming ability of certain alloy structures. They include at least one of Ni—Ge—B, Ni—Co—Mn—B, and Ni—Mn—Ge—B, as well as low-melting eutectics like Ni—Ge—B—Au, Ni—Ge—Mn, and Ni—Mn—B. With regard to flow properties, the melting point of the braze composition is usually in the range of about 870° C. to about 1260° C., and in some specific embodiments, in the range of about 950° C. to about 1225° C.

Depending in part on the manner of use for the braze, the alloy composition can also include a number of additives that are effective for selected purposes. The selection of any particular additive will depend on many of the factors described above, as well as the form in which the braze composition will be used, e.g., as a powder, paste, slurry, and the like. Braze slurries, for example, sometimes contain at least one binder and a solvent, e.g., aqueous or organic solvents. The binders are often water-based materials such as polyethylene oxide and various acrylics; or solvent-based materials. Other additives that can be used in a braze alloy composition include dispersants, wetting agents, deflocculants, stabilizers, anti-settling agents, thickening agents, plasticizers, emollients, lubricants, surfactants, anti-foam agents, polymer gels, and curing modifiers.

Superalloy articles (or articles formed from other high-temperature metallic materials), that include brazed joints and/or filler structures constitute other embodiments of this invention. As one-non-limiting example, turbine engine nozzles, combustors, and blades may develop cracks that can be repaired by the use of the braze alloy-filler materials described herein. Furthermore, in terms of other uses for the braze, articles that include at least two metallic components joined together by a braze joint represent another embodiment of the invention.

Gas turbines represent key articles that can benefit from the use of the braze alloy described herein. Gas turbine engines (e.g., turbomachinery) can be found in a number of different industrial environments, e.g., aviation engines, land-based turbines (heavy frame and aeroderivative), marine applications, and the like.

A method for joining a metal component to another metal component by brazing constitutes another embodiment of the invention. The method comprises:
i) introducing a nickel-based braze alloy composition between the metal components; and
ii) heating the components to form a braze seal (joint) between them.

The nickel-based braze alloy composition used for this process comprises the constituents described previously, i.e.,
a) nickel (Ni);
b) about 1 weight % to about 5 weight % boron (B); and
c) about 1 weight % to about 20 weight % germanium (Ge).

The composition must be free of silicon, but in some key, optional embodiments, contains specific levels of gold and/or manganese. Moreover, in other embodiments, the braze composition is free of at least one of the following elements: copper, silver, indium, tin, antimony, bismuth and gallium (except for impurity-levels). In some specific cases, the braze composition is free of all of those elements.

The heating step for this method is typically carried out at a brazing temperature, greater than or equal to the liquidus temperature of the braze alloy composition, and less than the melting temperatures of the components to be joined. In some cases, the brazing temperature is in the range of about 870° C. (1600° F.) to about 1260° C. (2300° F.). Particular ranges will depend on a variety of factors described above. Frequently, an appropriate brazing range is from about 1750° F. (954° C.) to about 2200° F. (1204° C.), while in other cases, an ideal range is from about 1900° F. (1038° C.) to about 2240° F. (1227° C.). In general, though, a key feature of this invention relates to the wide range of brazing temperatures that can be employed (beginning with the low temperature noted above, e.g., about 1600° F.), and the processing flexibility such a wide range provides. Typically, the braze alloy, i.e., the filler metal, flows into the joint between the components by capillary action.

Another embodiment is directed to a method for filling a cavity (such as a crack) in a component formed of a nickel-based superalloy material. The method usually comprises the following steps: (I) incorporating a braze composition into the cavity, wherein the braze composition is as described above; (II) heating the braze composition to a brazing temperature sufficient to melt the composition and to cause it to flow and completely fill the cavity, while not melting any surrounding material of the component; and (III) cooling the braze composition so that it re-solidifies within the cavity. These brazing processes benefit from the various attributes of the compositions described herein, such as melting point, melting point flexibility, and "flowability", as well as environmental resistance in the completed braze.

Figure 2:
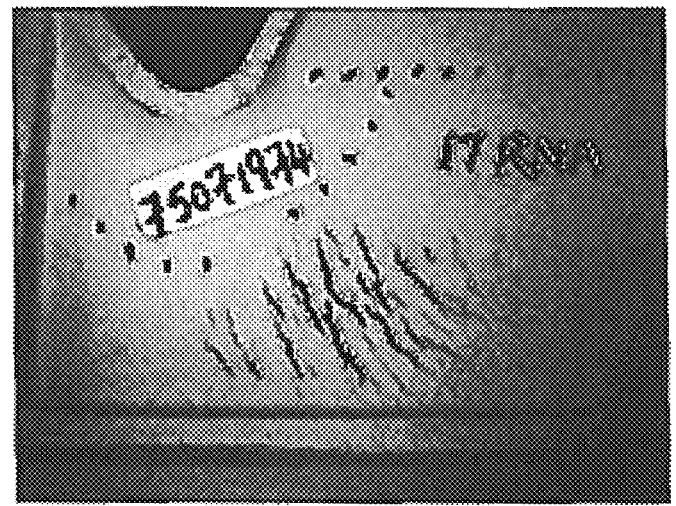
FIG. 2 is a photograph of another type of crack in a superalloy component.

FIGS. 1 and 2 depict portions of nozzle sections of turbine engines, formed from nickel-based alloys. The cracks are very apparent in each figure, and represent damage to the nozzle section, requiring repair, or complete replacement of the nozzle. The method embodiments described above can be very effective for these types of crack repair.

EXAMPLES

The examples that follow are merely illustrative, and should not be construed to be any sort of limitation on the scope of the claimed invention. Unless specified otherwise, all ingredients should be commercially available from such common chemical suppliers as Alpha Aesar, Inc. (Ward Hill, Massachusetts), Sigma Aldrich (St. Louis, Missouri), Spectrum Chemical Mfg. Corp. (Gardena, California), and the like.

Various nickel-based braze alloy samples within the scope of this invention were prepared. For each braze sample, individual elements were weighed according to the desired composition. These elements were arc-melted or vacuum induction melted to provide an ingot for each composition. To ensure homogeneity of the compositions, the ingots were triple-melted after arc melting. The ingots were then characterized for measuring liquidus temperatures, using a Differential Scanning calorimeter (DSC) technique. The ingots were melt-spun into thin (about 40 microns thick) ribbons, in a pure argon atmosphere. Ductility was also measured for the samples by a bend ductility test and folding/crease test, where the foil is considered to be ductile if it doesn't fracture in a brittle manner upon bending, folding or creasing by 180 degrees.

Figure 3:
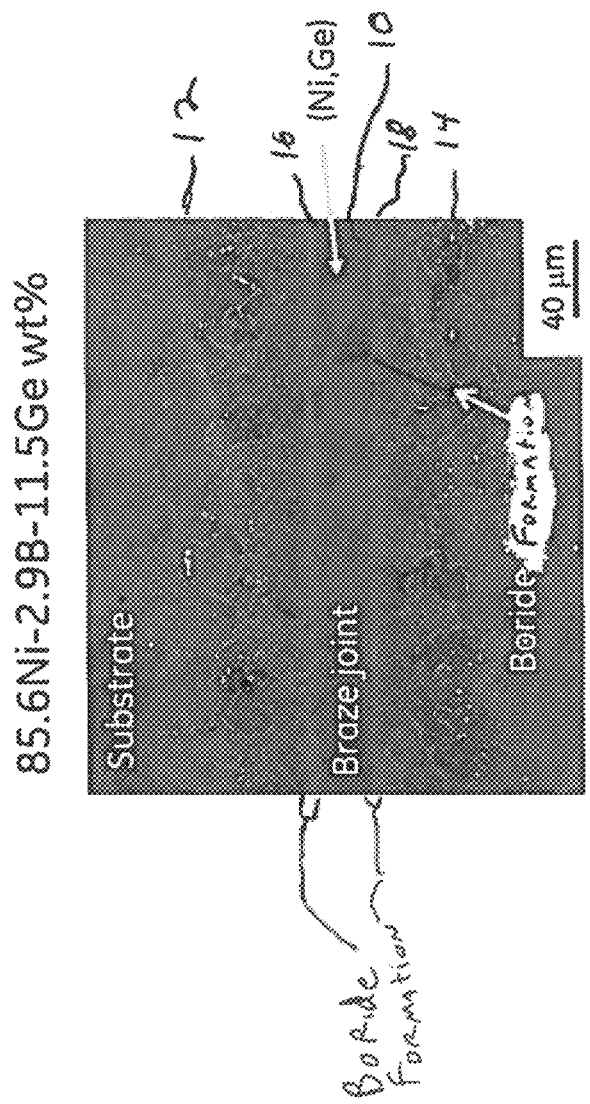
FIG. 3 is a magnified photomicrograph of a braze joint, using a composition according to some embodiments of this disclosure.

FIG. 3 is an image of braze joint 10 made with 85.6Ni-2.9B-11.5Ge wt %, according to embodiments of the present invention. Joint 10 has been formed between two substrate portions 12 and 14, formed of a nickel-based Inconel™ alloy, according to the procedure set forth above. Regions 16 and 18 of boride formation show as thin whitish streaks. The joint 10 itself is substantially free of any boride material. Moreover, the joint exhibited ductility, due in part to the presence of the nickel matrix, with strengthening by germanium; and with the absence of any brittle centerline compounds (a typical, undesirable feature in many brazes that contain silicon).

Figure 4:
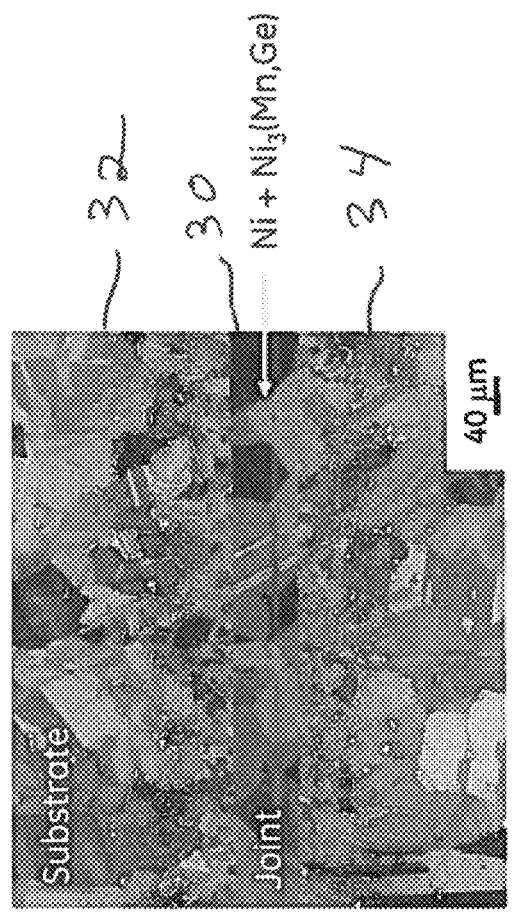
FIG. 4 is another magnified photomicrograph of a braze joint, using a composition according to some other embodiments of this disclosure.

FIG. 4 is an image of braze joint 30 made with 65.8Ni-20Mn-4Ge-7Cr-3.2B wt %, according to embodiments of the present invention. Joint 30 has been formed between two Inconel™ substrate portions 32 and 34, according to the procedure set forth above. Borides that had formed (not specifically visible in the figure) as boron diffused away from the joint, migrated into the grain boundaries of the substrate. The joint exhibited ductility, due in part to the nickel matrix, with strengthening by the gamma' $Ni_3(Mn, Ge)$ phase, which is itself ductile.

The patentable scope of the invention set forth herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed:

1. A method for joining a first metal component to a second metal component by brazing, the method comprising:
   introducing a braze alloy composition between the first metal component and the second metal component, wherein the braze alloy composition consists of:
   at least 40 weight % nickel;
   1 weight % to 5 weight % boron;
   7 weight % to 15 weight % chromium;
   1 weight % to 20 weight % germanium; wherein said braze alloy composition is free of silicon, hafnium, and zirconium; and
   optionally, at least one element selected from 0.5 weight % to 40 weight % cobalt, 0.05 weight % to about 10 weight % gold, 0.01 weight % to 0.2 weight % carbon, 0.01 weight % to 0.2 weight % yttrium, 5 weight % to 28 weight % manganese, 0.5 weight % to 8 weight % iron, 0.5 weight % to 8 weight % niobium, 0.5 weight % to 8 weight % tantalum, 0.5 weight % to 8 weight % molybdenum, 0.5 weight % to 8 weight % tungsten, or combinations thereof; and
   heating the first metal component, the second metal component, and the braze alloy composition to form a braze joint between the first metal component and the second metal component.

2. The method of claim 1, wherein 14 weight % to 15 weight % of chromium is present in the braze alloy composition.

3. The method of claim 1, wherein 0.5 weight % to 30 weight % of cobalt is present in the braze alloy composition.

4. The method of claim 1, wherein 1 weight % to about 7 weight % of gold is present in the braze alloy composition.

5. The method of claim 1, wherein at least one element selected from 0.01 weight % to 0.2 weight % carbon or 0.01 weight % to 0.2 weight % yttrium is present in the braze alloy composition.

6. The method of claim 1, wherein 1 weight % to 3.4 weight % of boron is present in the braze alloy composition.

7. The method of claim 1, wherein 2 weight % to 18 weight % of germanium is present in the braze alloy composition.

8. The method of claim 1, wherein an atomic ratio of manganese to germanium is greater than 1.1:1.0.

9. The method of claim 1, wherein the braze alloy composition has an amorphous microstructure.

10. The method of claim 1, wherein the braze alloy composition is free of aluminum.

11. The method of claim 1, wherein the braze alloy composition is free of palladium.

12. The method of claim 1, wherein the braze alloy composition has a melting point of 870° C. to 1260° C.

* * * * *